US009182855B2

(12) United States Patent
Koh et al.

(10) Patent No.: US 9,182,855 B2
(45) Date of Patent: Nov. 10, 2015

(54) METHOD AND APPARATUS FOR ADJUSTING TOUCH SENSITIVITY OF TOUCH SENSOR IN PORTABLE TERMINAL

(75) Inventors: Myung Geun Koh, Suwon-si (KR); Yi Kyu Min, Youngin-si (KR); Kyung Goo Lee, Seoul (KR); Byoung Il Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 13/109,290

(22) Filed: May 17, 2011

(65) Prior Publication Data
US 2012/0218195 A1    Aug. 30, 2012

(30) Foreign Application Priority Data

Feb. 24, 2011   (KR) .................. 10-2011-0016299

(51) Int. Cl.
G06F 3/045    (2006.01)
G06F 3/044    (2006.01)
G06F 1/16     (2006.01)
G06F 3/041    (2006.01)

(52) U.S. Cl.
CPC .............. *G06F 3/044* (2013.01); *G06F 1/169* (2013.01); *G06F 3/0416* (2013.01)

(58) Field of Classification Search
None
See application file for complete search history.

(56) References Cited

U.S. PATENT DOCUMENTS

| 4,814,690 | A | * | 3/1989 | Melcher et al. | 324/674 |
| 2003/0080744 | A1 | * | 5/2003 | Goldfine et al. | 324/345 |
| 2007/0216424 | A1 | * | 9/2007 | Sieh et al. | 324/662 |
| 2008/0277171 | A1 | * | 11/2008 | Wright | 178/18.06 |
| 2010/0013778 | A1 | * | 1/2010 | Liu et al. | 345/173 |
| 2010/0300862 | A1 | * | 12/2010 | Tamura et al. | 200/600 |
| 2012/0127124 | A1 | * | 5/2012 | Zanone et al. | 345/174 |
| 2012/0131453 | A1 | * | 5/2012 | Pechanec et al. | 715/702 |

OTHER PUBLICATIONS

U.S. Appl. No. 61/393,764.*

* cited by examiner

*Primary Examiner* — Joseph Haley
*Assistant Examiner* — Ifedayo Iluyomade
(74) *Attorney, Agent, or Firm* — Jefferson IP Law, LLP

(57) ABSTRACT

A method for adjusting a touch sensitivity of a touch sensor in a portable terminal and an apparatus thereof are provided. The method includes measuring a permittivity of an object located within a preset distance by a grip sensor disposed at a rear portion of the portable terminal when the touch sensor turned-on, and setting and adjusting a touch sensitivity corresponding to the measured permittivity of the object corresponding to the touch sensor of the portable terminal. The method adjusts the touch sensitivity of a touch sensor in a portable terminal according to a peripheral environment to improve the touch sensitivity of the touch sensor.

11 Claims, 4 Drawing Sheets

METHOD AND APPARATUS FOR ADJUSTING TOUCH SENSITIVITY OF TOUCH SENSOR IN PORTABLE TERMINAL

PRIORITY

This application claims the benefit under 35 U.S.C. §119 (a) of a Korean patent application filed on Feb. 24, 2011 in the Korean Intellectual Property Office and assigned Serial No. 10-2011-0016299, the entire disclosure of which is hereby incorporated by reference.

BACKGROUND OF THE INVENTION

1. Field of the Invention

The present invention relates to an operating method and apparatus of a portable terminal. More particularly, the present invention relates to a method for adjusting touch sensitivity of a touch sensor in a portable terminal, and an apparatus thereof.

2. Description of the Related Art

In general, a portable terminal has various functions to execute complex functions. In this case, the portable terminal includes an input unit such as a keyboard or a mouse for executing all types of functions, but portability of the input unit is not easy. Accordingly, to solve the foregoing problem, a conventional portable terminal includes a touch panel instead of a keyboard or a mouse. In this case, the touch panel may be composed of a plurality of touch sensors. That is, upon sensing a touch operation in the touch sensor, the portable terminal executes a function corresponding to the touch operation. Here, the touch sensor senses the touch operation according to a set touch sensitivity.

However, in a portable terminal as illustrated above, the touch sensitivity of a touch sensor may change according to a peripheral environment. For example, when a user grips the portable terminal by hand, the touch sensitivity of the touch sensor may maintain. However, when the portable terminal is on a table, touch sensitivity of the touch sensor may be deteriorated. Namely, when the portable terminal contacts an insulated material, the touch sensitivity of the touch sensor may be deteriorated. This may significantly deteriorate the touch sensitivity of a touch sensor in a portable terminal. Furthermore, an operational efficiency of the portable terminal may consequently also be deteriorated.

SUMMARY OF THE INVENTION

Aspects of the present invention are to address at least the above-mentioned problems and/or disadvantages and to provide at least the advantages described below. Accordingly, an aspect of the present invention is to provide a method for adjusting a touch sensitivity of a touch sensor in a portable terminal and an apparatus thereof.

In accordance with an aspect of the present invention, a method for adjusting a touch sensitivity of a touch sensor in a portable terminal is provided. The method includes measuring permittivity of an object located within a preset distance by a grip sensor disposed at a rear portion of the portable terminal when the touch sensor is in a turned-on state, and setting and adjusting the touch sensitivity corresponding to the measured permittivity of the object corresponding to the touch sensor of the portable terminal.

Measuring the permittivity of an object includes measuring capacitance created between the grip sensor and the object, and determining the permittivity of the object according to the measured capacitance. Measuring the permittivity of an object is performed within a time-period of a preset time interval. The setting and adjusting of the touch sensitivity includes determining a touch sensitivity corresponding to the measured permittivity, and updating the set touch sensitivity to the determined touch sensitivity when the determined touch sensitivity differs from the set touch sensitivity. Determining the touch sensitivity includes checking whether the object is a conductive object or a non-conductive object according to the measured permittivity, determining the touch sensitivity of the object lower than that of the non-conductive object when the object is the conductive object, and determining the touch sensitivity of the object higher than that of the conductive object when the object is the non-conductive object.

In accordance with another aspect of the present invention, an apparatus for adjusting touch sensitivity in a portable terminal is provided. The apparatus includes a touch sensor for sensing a touch operation, a grip sensor disposed at a rear portion of the portable terminal for measuring permittivity of an object located within a preset distance when the touch sensor is in a turned-on state, and a controller for controlling the touch sensor and the grip sensor and for setting and adjusting a touch sensitivity according to the measured permittivity corresponding to the touch sensor.

The grip sensor measures a capacitance between the grip sensor and the object, and the controller determines the permittivity according to the measured capacitance. The controller drives the grip sensor with a time-period of a preset time interval. The controller determines the touch sensitivity corresponding to the measured permittivity, and updates the set touch sensitivity to the determined touch sensitivity when the determined touch sensitivity differs from the set touch sensitivity. The controller determines whether the object is a conductive object or a non-conductive object according to the measured permittivity, determines the touch sensitivity of the object to be lower than that of the non-conductive object when the object is the conductive object, and determines the touch sensitivity of the object to be higher than that of the conductive object when the object is the non-conductive object.

In accordance with another aspect of the present invention, an apparatus for adjusting a touch sensitivity in a portable terminal is provided. The apparatus includes an outer case for mounting and protecting a touch sensor, a grip sensor, and a controller therein, and comprising an insulated material, wherein the grip sensor is exposed to an exterior via a through hole formed in the outer case and comprises a non-insulated material.

A method and an apparatus for adjusting a touch sensitivity of a touch sensor in a portable terminal according to the present invention may adjust the touch sensitivity of the touch sensor in the portable terminal according to a peripheral environment. That is, the present invention may adjust the touch sensitivity of the touch sensor in the portable terminal according to a permittivity of a peripheral body gripping or holding the portable terminal. Through this, the present invention improves the performance of a touch sensor in a portable terminal. Accordingly, the touch sensitivity of a touch sensor in the portable terminal may be enhanced. In addition, an operational efficiency of the portable terminal is thereby improved.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
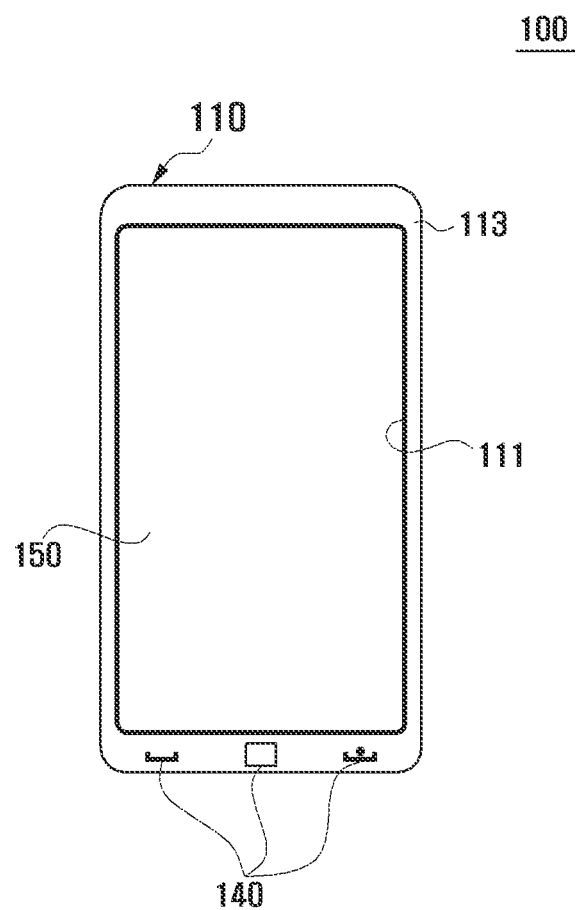
FIG. 1 is a front elevation illustrating an appearance of a portable terminal according to an exemplary embodiment of the present invention.
Figure 2:
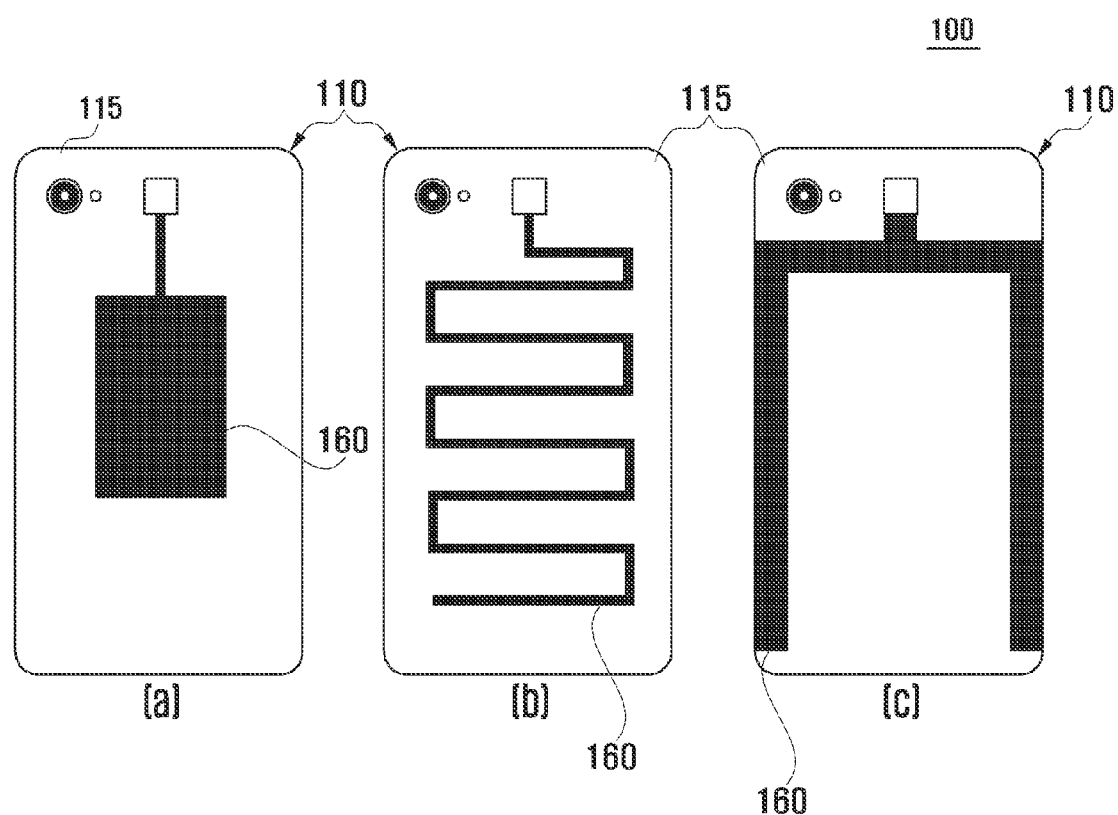
FIG. 2 is a rear elevation illustrating an appearance of a portable terminal according to an exemplary embodiment of the present invention.
Figure 3:
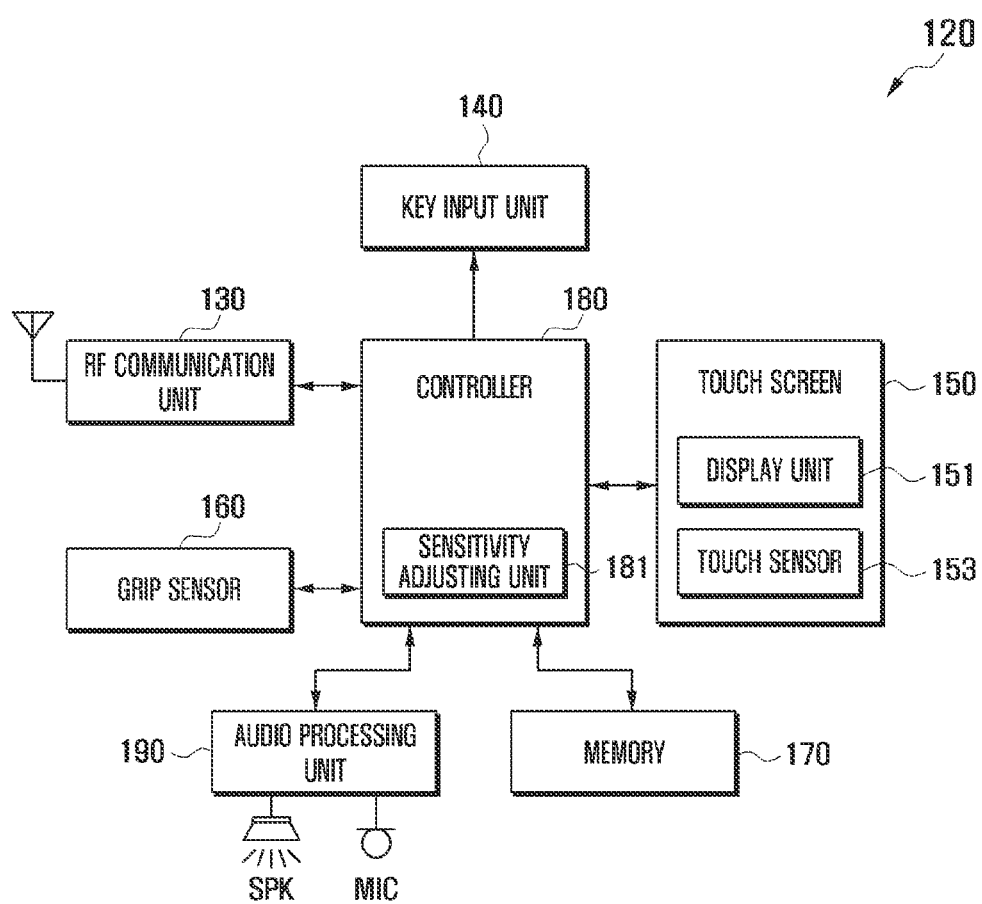
FIG. 3 is a block diagram illustrating an internal configuration of a portable terminal according to an exemplary embodiment of the present invention.

FIG. 1 is a front elevation illustrating an appearance of a portable terminal according to an exemplary embodiment of the present invention. FIG. 2 is a rear elevation illustrating an appearance of a portable terminal according to an exemplary embodiment of the present invention. FIG. 3 is a block diagram illustrating an internal configuration of a portable terminal according to an exemplary embodiment of the present invention. In this example, it is assumed that the portable terminal is a portable phone in this exemplary embodiment.

Referring to FIG. 1, FIG. 2, and FIG. 3, a portable terminal 100 of this exemplary embodiment includes an outer case 110 and an inner assembly 120.

The outer case 110 is implemented by a structure having an inner space. Further, the outer case 110 serves to protect the inner space. The outer case 110 is made of an insulated material. For example, the outer case 110 may be made of a plastic material or a ceramic material. In the meantime, the outer case 110 is implemented by a structure with at least two through-holes 111 for exposing an inner space to an exterior. Here, each of the through-holes 111 extends in a predetermined shape in the outer case 110.

In this example, the outer case 110 may be configured by a front case 113 disposed at a front portion of the portable terminal 100 and a rear case 115 disposed at a rear portion of the portable terminal 100. The front case 113 and the rear case 115 engage with each other at a side portion of the portable terminal 100 through respective peripheral areas to provide an inner space in the outer case 110. Some of the through holes 111 are formed in the front case 113 to expose an inner space of the outer case 110 in a front portion of the portable terminal 100. Remainders of the through holes 111 may be formed in the rear case 115 to expose the inner space of the outer case 110 in a rear portion of the portable terminal 100.

The inner assembly 120 is mounted at the inner space of the outer case 110. In this case, a partial configuration of the inner assembly 120 is exposed to an exterior via the through-hole 111 of the outer case 110. Furthermore, the inner assembly 120 includes a circuit board (not shown). Meanwhile, respective structural elements of the inner assembly 120 may mechanically or electrically connect to each other via the circuit board. The inner assembly 120 includes a Radio Frequency (RF) communicating unit 130, a key input unit 140, a touch screen 150, a grip sensor 160, a memory 170, a controller 180, and an audio processing unit 190.

The RF communication unit 130 executes a radio frequency communication function. The RF communication unit 130 may include an RF transmitter (not shown) for up-converting a frequency of a transmitted signal and amplifying the signal, and an RF receiver (not shown) for low-noise-amplifying a received signal and down-converting the signal.

The key input unit 140 includes function keys for setting and executing all types of functions. In this case, the key input unit 140 may be exposed to an exterior via a through-hole 111 of the outer case 110. Here, the key input unit 140 may be exposed to at least one of a front portion or a side portion of the outer case 110.

The touch screen 150 includes a display unit 151 and a plurality of touch sensors 153. The display unit 151 displays a state of the portable terminal 100. In this example, the display unit 151 is implemented by a Liquid Crystal Display (LCD), and includes an LCD controller, a memory for storing display data, and an LCD display element. The touch sensors 153 sense a touch operation on the display unit 151. The touch sensors 153 detect changes in physical quantities, namely, resistance or capacitance, to sense a touch operation. Moreover, the touch sensors 153 convert a detected change in the physical quantity into a touch signal. In this case, the touch sensors 153 sense a touch operation according to a set touch sensitivity. Here, the touch sensors 153 may be implemented by a touch panel and may be mounted on the display unit 131. In addition, the touch screen 150 is exposed to an exterior via a through-hole 111 of the outer case 110. Here, the touch screen 150 may be exposed in a front portion of the outer case 110.

The grip sensor 160 executes a function for measuring an electrical permittivity of a peripheral area in the portable terminal 100. That is, the grip sensor 160 measures the permittivity of an adjacent body (not shown) located within a preset distance. Here, the adjacent body may include an object gripping or holding the portable terminal 100, for example, a user's hand contacting the portable terminal 100, a holder, a table, and the like. In this case, the grip sensor 160 may sense a change in capacitance due to the adjacent body. Here, the outer case 110 may be made of an insulated material such that the grip sensor 160 may efficiently sense changes in the capacitance. That is, the grip sensor 160 may measure the capacitance created with an adjacent body between.

In this example, the grip sensor 160 may be made of a non-insulated material. Further, the grip sensor 160 may be exposed to an exterior via a through-hole 111 of the outer case 110. Here, the grip sensor 160 may be exposed in an area substantially contacting with an adjacent body, for example, a rear portion of the outer case 110, to use the portable terminal 100. Meanwhile, the grip sensor 160 may be exposed in various shapes. Here, the grip sensor 160 may, for example, be implemented by one of a meander type, a spiral type, a step type, or a loop type. Some examples of implementations of grip sensor 160 are depicted in FIG. 2.

The memory 170 may include a program memory and a data memory. The program memory stores programs for controlling a general operation of the portable terminal 100. The program memory may further store programs for adjusting the touch sensitivity of the touch sensor 153 according to an exemplary embodiment of the present invention. The data memory executes a function of storing data created during execution of programs. In this example, the memory 170 may store corresponding touch sensitivity determined in accordance with permittivities according to an exemplary embodiment of the present invention.

The controller 180 executes a function of controlling an overall operation of the portable terminal 100. The controller 180 includes a data processor comprising a transmitter encoding and modulating a transmitted signal and a receiver demodulating and decoding a received signal. In this case, the data processor may be configured by a MOulator-DEModulator (MODEM) and a COder-DECoder (CODEC). The CODEC includes a data CODEC processing packet data and an audio CODEC processing an audio signal, such as speech. Further, the controller 180 adjusts the touch sensitivity of a touch sensor 153 according to a peripheral environment of the portable terminal 100. In this example, the controller 180 may turn the touch sensor 153 on or off. Here, upon turning on the touch sensor 153, the controller 180 may drive a grip sensor 160. Moreover, the controller 180 may drive the grip sensor 160 with a time period of a preset time interval.

In this example, the controller 180 includes a sensitivity adjusting unit 181 according to an exemplary embodiment of the present invention. The sensitivity adjusting unit 181 adjusts the touch sensitivity of a touch sensor 153 according to a permittivity of an adjacent body. Here, the sensitivity adjusting unit 181 may adjust the touch sensitivity of the touch sensor 153 corresponding to a change in capacitance due to an adjacent body detected by the grip sensor 160. Namely, the sensitivity adjusting unit 181 determines the permittivity of an adjacent body according to a capacitance created between the grip sensor 160 and the adjacent body, and correspondingly adjusts the touch sensitivity of the touch sensor 153.

The audio processing unit 190 executes a function of playing a received audio signal provided from an audio CODEC of the data processor through a speaker SPK or transmitting a transmitted audio signal generated from a microphone MIC to the audio CODEC of the data processor. In this case, at least one of the speaker SPK or the microphone MIC may be exposed to an exterior via a through-hole 111 of the outer case 110.

Figure 4:
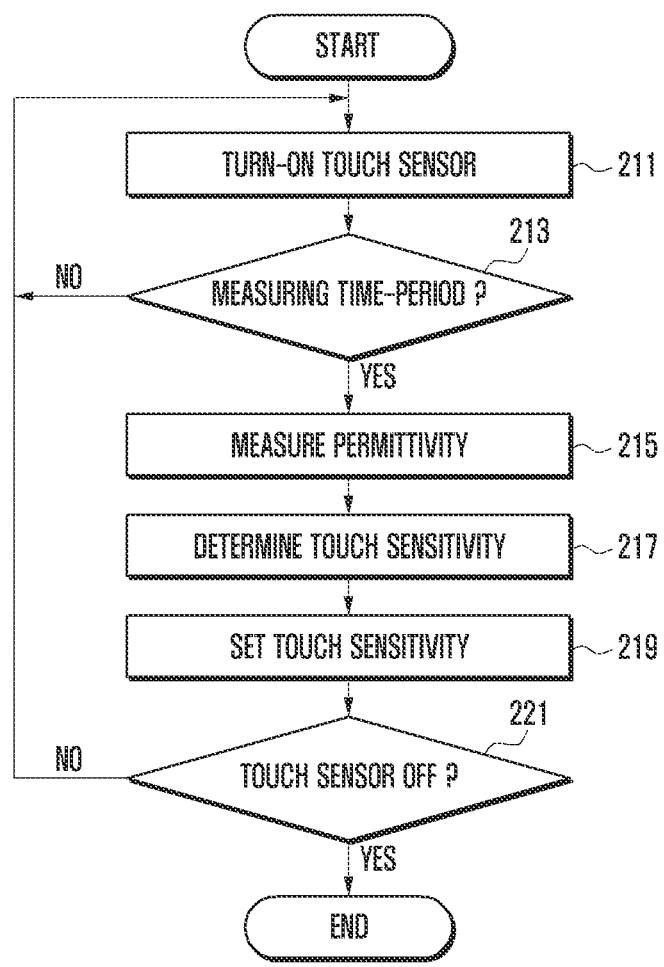
FIG. 4 is a flowchart illustrating a method for adjusting a touch sensitivity in a portable terminal according to an exemplary embodiment of the present invention.

FIG. 4 is a flowchart illustrating a method for adjusting touch sensitivity in a portable terminal according to an exemplary embodiment of the present invention.

Referring to FIG. 4, a method for adjusting a touch sensor according to an exemplary embodiment of the present invention starts with the turn-on of a touch sensor 153 at step 211.

In this example, the controller 180 may supply power to the touch sensor 153 to turn on the touch sensor 153. Here, the controller 180 may turn on the touch sensor 153 according to a request from the portable terminal 100 user. The controller 180 may turn on the touch sensor 153 corresponding to a communication event received from an exterior. Further, the controller 180 may maintain the on state of the touch sensor 153. Here, the controller 180 may maintain the on state of the touch sensor 153 during a predetermined time interval, either from a turn-on time point of the touch sensor 153 or from a time point of sensing a touch operation in the touch sensor 153.

Next, the controller 180 determines whether a measuring time-period has occurred at step 213. When the measuring time-period occurs, the controller 180 drives the grip sensor 160 to measure a permittivity of an adjacent body at step 215. At this time, the grip sensor 160 measures the permittivity of the adjacent body located with a preset distance. Here, a grip sensor 160 may sense a change in capacitance due to the adjacent body. That is, the grip sensor 160 may measure a capacitance with the adjacent body. Moreover, the controller 180 may determine the permittivity of the adjacent body according to the capacitance created between the grip sensor 160 and the adjacent body.

Subsequently, the controller 180 determines a touch sensitivity corresponding to the permittivity of the adjacent body at step 217. In this example, the controller 180 may determine a touch sensitivity corresponding to a change in the capacitance between the adjacent body and the grip sensor 160. Here, the controller 180 may determine whether the adjacent body is a conductive object or a non-conductive object according to the permittivity of the adjacent body. When the adjacent body is the conductive object, the controller may determine that the touch sensitivity thereof has a value lower than that of the non-conductive object. When the adjacent body is the non-conductive object, the controller may determine that touch sensitivity thereof has a value higher than that of the conductive object. To do this, the memory 170 may store touch sensitivity by permittivities, as illustrated in Table 1.

TABLE 1

| Permittivity | Adjacent body | Touch sensitivity |
|---|---|---|
| Greater than reference value | Conductive | First level |
| Less than reference value | Non-conductive | Second level |

For example, when the permittivity of the adjacent body is equal to or greater than a reference value, the controller 180 determines that the adjacent body is the conductive object. Further, the controller 180 may determine that the touch sensitivity has a first level. That is, when a user grips the portable terminal 100 in a hand, the controller 180 may determine that the touch sensitivity has the first level. Conversely, when the permittivity of the adjacent body is less than the reference value, the controller 180 may determine that the adjacent body is the non-conductive object. Moreover, the controller 180 may determine that the touch sensitivity has a second level higher than the first level. Namely, when the portable terminal 100 is held on a table, the controller 180 may determine that the touch sensitivity has the second level.

Next, the controller 180 sets the touch sensitivity in the touch sensor 153 at step 219. In this case, the controller 180 may compare a corresponding touch sensitivity with the set touch sensitivity. When the corresponding touch sensitivity differs from the set touch sensitivity, the controller 180 may change and update the set touch sensitivity to the corresponding touch sensitivity. Conversely, when the corresponding touch sensitivity is identical with the set touch sensitivity, the controller 180 may maintain the set touch sensitivity. Through this, the controller 180 may adjust the touch sensitivity of a touch sensor 153 according to permittivity of the adjacent body.

Finally, upon turning off the touch sensor 153, the controller 180 senses it at step 221 and terminates a procedure for adjusting the touch sensitivity. At this time, the controller 180 may intercept a supply of power to the touch sensor 153 to turn off the touch sensor 153. Here, the controller 180 may turn off the touch sensor 153 according to a request of the portable terminal 100 user. When a predetermined time interval elapses from a turning-on time point of the touch sensor 153, the controller 180 turns off the touch sensor 153. Further, when a predetermined time interval elapses from a time point of sensing a touch operation in the touch sensor 153, the controller 180 may turn off the touch sensor 153. The controller 180 may maintain an off state of the touch sensor 153. Meanwhile, the controller 180 may set and maintain a current touch sensitivity corresponding to the touch sensor 153. Moreover, the controller 180 may initialize a current touch sensitivity corresponding to the touch sensor 153.

In the meantime, after the touch sensitivity is set in the touch sensor at step 219, when the turning off of the touch sensor 153 is not detected at step 221, the controller 180 repeats step 211 to step 221. That is, the controller 180 may repeat step 211 to step 221 with a measuring time period to set or update the touch sensitivity in the touch sensor 153.

The foregoing exemplary embodiment has been described wherein a portable terminal sets a touch sensitivity corresponding to the substantial permittivity of an adjacent body. However, the present invention is not limited thereto. Namely, the portable terminal may set the touch sensitivity according to a change value between stored permittivity and currently measured permittivity to implement the present invention. For example, the portable terminal may calculate a change value of permittivity to determine a corresponding adjusting value of the touch sensitivity. Furthermore, the portable terminal may set the touch sensitivity by applying a corresponding adjusting value to the set touch sensitivity. To do this, the portable terminal may store an adjusting value of touch sensitivity by change values of the permittivity.

The present invention may adjust the touch sensitivity of a touch sensor in a portable terminal according to a peripheral environment. That is, the present invention may adjust the touch sensitivity of a touch sensor in a portable terminal according to the permittivity of an adjacent body gripping or holding the portable terminal. Through this, the present invention may improve the performance of a touch sensor in a portable terminal. Accordingly, the touch sensitivity of a touch sensor may be enhanced in the portable terminal. In addition, operational efficiency of the portable terminal may be improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for adjusting a touch sensitivity of a touch sensor in a portable terminal, the method comprising:
   measuring a permittivity of an object located within a certain distance using a sensor disposed in the portable terminal;
   determining a relative touch sensitivity of the touch sensor based on the measured permittivity of the object;
   adjusting the touch sensitivity of the touch sensor to the determined relative touch sensitivity; and
   sensing a touch operation based on the adjusted touch sensitivity.

2. The method of claim 1, wherein measuring the permittivity of the object comprises:
   measuring a capacitance between the sensor and the object; and
   determining the permittivity of the object according to the measured capacitance.

3. The method of claim 1, wherein measuring the permittivity of the object is performed with a time period of a preset time interval.

4. The method of claim 3, wherein adjusting the touch sensitivity comprises:
   determining a touch sensitivity corresponding to the permittivity measured to the time period of the preset time interval; and
   updating the adjusted touch sensitivity to the determined touch sensitivity when the determined touch sensitivity differs from the adjusted touch sensitivity.

5. The method of claim 1, wherein determining the relative touch sensitivity comprises:
   determining whether the object is a conductive object or a non-conductive object according to the measured permittivity; and
   determining the touch sensitivity of the touch sensor, in case the object is the conductive object, to be lower than the touch sensitivity of the touch sensor in case the object is the non-conductive object, and determining the touch sensitivity of the touch sensor, in case the object is the non-conductive object, to be higher than the touch sensitivity of the touch sensor in case the object is the conductive object.

6. An apparatus for adjusting a touch sensitivity in a portable terminal, the apparatus comprising:
   a touch sensor configured to detect a touch operation;
   a sensor disposed in the portable terminal, configured to measure a permittivity of an object located within a certain distance; and
   a controller configured to control to determine a relative touch sensitivity of the touch sensor based on the measured permittivity of the object, adjust the touch sensitivity of the touch sensor to the determined relative touch sensitivity, and to sense a touch operation based on the adjusted touch sensitivity.

7. The apparatus of claim 6, wherein the sensor is configured to measure a capacitance between the sensor and the object, and to determine the permittivity according to the measured capacitance.

8. The apparatus of claim 6, wherein the controller is configured to drive the sensor for measuring permittivity with a time period of a preset time interval.

9. The apparatus of claim 8, wherein the controller is configured to determine the touch sensitivity corresponding to the permittivity measured to the time period of the preset time interval, and updates the adjusted touch sensitivity to the determined touch sensitivity when the determined touch sensitivity differs from the adjusted touch sensitivity.

10. The apparatus of claim 6, wherein the controller is configured to determine whether the object is a conductive object or a non-conductive object according to the measured permittivity, to determine the touch sensitivity of the touch sensor in case the object is the conductive object to be lower than the touch sensitivity of the touch sensor in case the object is the non-conductive object, and to determine the touch sensitivity of the touch sensor in case the object is the non-conductive object to be higher than the touch sensitivity of the touch sensor in case the object is the conductive object.

11. The apparatus of claim 6, further comprising an outer case configured to mount and protect the touch sensor, the sensor for measuring permittivity, and the controller therein, and comprising an insulated material,
    wherein the sensor for measuring permittivity is exposed to an exterior via a through-hole formed in the outer case, and comprises a non-insulated material.

* * * * *